Aug. 18, 1959     H. B. WHITEHURST     2,900,274
METHOD OF PROVIDING GLASS FILAMENTS
WITH A COATING OF SILVER
Original Filed Dec. 16, 1953
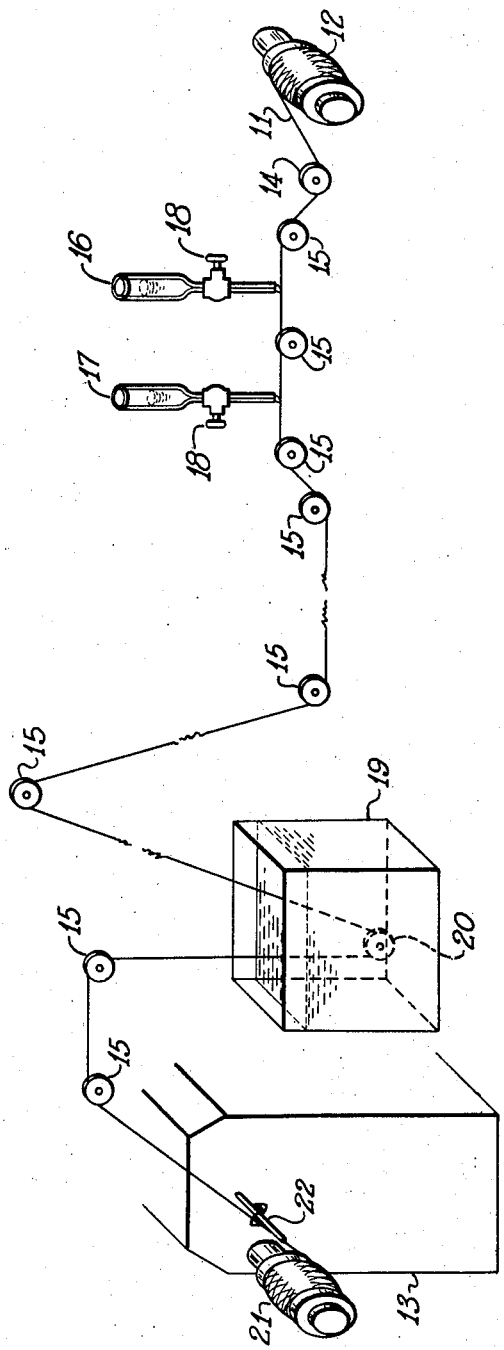
INVENTOR.
HARRY B. WHITEHURST
BY
ATTORNEYS

United States Patent Office 2,900,274
Patented Aug. 18, 1959

2,900,274

METHOD OF PROVIDING GLASS FILAMENTS WITH A COATING OF SILVER

Harry B. Whitehurst, Newark, Ohio, assignor to Owens-Corning Fiberglas Corporation, a corporation of Delaware Continuation of abandoned application Serial No. 398,544, December 16, 1953. This application December 24, 1956, Serial No. 630,379

4 Claims. (Cl. 117—54)

This invention relates to coating fibrous glass and fibrous glass products and especially to methods and apparatus for applying metal to these materials to enhance their physical properties. This application is a continuation of an application having Serial No. 398,544, filed December 16, 1953, now abandoned.

Fibrous glass as used herein includes individual fibers, a plurality of fibers in the form of a bundle or strand, yarn, cord or the like and products such as fabrics, tapes, mats, boards or heat felted fibers and others.

In the past several methods for applying metal to fibrous glass have been devised. For instance, fibrous glass has been drawn through a molten bead of metal in order to coat the fiber with a substantially continuous layer of metal. Using these methods, it has been found desirable to employ a low melting temperature metal so that the properties of the fibrous glass are not deleteriously affected. For certain applications of metal coated fibrous glass, it is desirable to have coatings of a metal having a high melting temperature. Certain of the high melting temperature metals have advantageous physical properties such as good electrical conductivity, good physical appearance and the like.

It is an object of this invention to provide metal coated fibrous glass and fibrous glass products.

It is a further object to provide a continuous method of metal coating fibrous glass.

It is also an object to provide a method and apparatus for metalizing fibrous glass textile products.

It is an object to provide a method for applying a high melting temperature metal to fibrous glass and fibrous glass products.

It has been discovered that fibrous glass textile products can be coated in a continuous manner by introducing chemical reactants upon the advancing fibrous glass where they are retained by capillary action and allowing the chemical reaction to take place in situ resulting in a substantially continuous and complete metal coating of the surfaces of the fibers in a fibrous glass textile product. Capillarity or capillary action as used herein includes not only the rise of a liquid in fine spaces between fibers due to surface tension but also the retention of a liquid in the fine spaces after the liquid has flowed therein.

The invention will be described in connection with a certain form of apparatus which may be used to carry out the process, however, the invention is not to be limited to this specific apparatus shown.

In the drawings:

The single figure is a view of apparatus adapted for applying the necessary reactants to a fibrous glass strand in order to metal coat the fibrous glass strand.

In the single figure a fibrous glass strand 11 comprising two-hundred or more individual filaments is being unwound from the package 12. The fibrous glass strand 11 as it is advanced by the action of the winder 13 passes successively over tension roll 14 and idler rolls 15, 15. The advancing fibrous glass strand passes below the reactant containers 16 and 17. Each of the reactant containers is provided with a metering valve 18.

After the advancing fibrous glass strand passes below the rectant containers 16 and 17, it is introduced into a washing bath in a container 19 provided with a submerged roll 20. The product is then wound into a package 21 by the combined action of the winder 13 and suitable traverse member 22.

In operating the apparatus shown in the drawing, a silver solution is prepared as one of the reactants and a reducing solution prepared as the other reactant. The silver solution is prepared as follows:

Silver nitrate crystals are added to concentrated ammonium hydroxide (29%) and the mixture stirred until the crystals are dispersed and only a brown precipitate remains. Additional concentrated ammonium hydroxide is added until the precipitate dissolves. An excess of ammonium hydroxide should be avoided, therefore, the ammonium hydroxide to dissolve the brown precipitate is added slowly with stirring. The silver solution may be prepared from about 50 parts of silver nitrate crystals and 35 parts of concentrated ammonium hydroxide (29%), the parts being by weight. Water may be added, if desired.

The reducing solution is prepared by saturating distilled water with hydrazine sulfate.

After the solutions are prepared, the silver solution is introduced into reactant container 16 and the hydrazine sulfate solution is introduced into reactant container 17, see the figure. The fibrous glass strand is threaded through the rolls, substantially as shown in the drawings and started upon the spindle of winder 13. Rotation of the winder is then commenced to advanced the fibrous glass strand at a rate of about 30 feet per minute. Metering valves 18, 18 are adjusted so that the reactants are introduced upon the advancing fibrous glass strand. Tension roll 14 keeps the strand taut as it passes by the reactant containers and receives the silver and reducing solutions.

The reaction time required to reduce the silver nitrate to a metallic silver coating is about 10 to 15 seconds or more, therefore, the strand should travel at least 7 or 8 feet after the reducing solution is introduced before passing into the washing water in container 19. After being washed, the silver coated strand air dries as it travels to the spindle of the winder and is formed into a package 21 by the action of winder 13 and traverse member 22. The product may be also be wrapped into a package while wet, if so desired.

In order to reduce the time required for the reaction to take place, heat may be applied to the strand after the reactants are introduced upon the strand or the strand may be subjected to the effects of ultra-violet light.

The fibrous glass strand which is to be coated according to the method just described should be heat cleaned if it has a size or lubricant upon it as supplied. Heat cleaning is acomplished by heating to from 485° to 650° C.

It should be understood that the fibrous glass product being coated may be wound either wet or dry when a washing bath has been used to remove the excess reactants. If no washing bath is to be used, the product is preferably completely dry before being wound into a package.

In another embodiment of the invention, fibrous glass strand is treated with the following size during the forming operation:

| Ingredient: | Parts by weight |
|---|---|
| Stannous chloride | 15 |
| Hydrochloric acid | 12 |
| Water | 4500 |

This strand may be treated directly with the silver and reducing solutions with no heat cleaning step being necessary. The yarn is not removed as easily from the package as is heat cleaned strand; however, successful operation can be achieved without a heat cleaning step by using such a size on the strand to facilitate removal of the strand from the forming package.

The apparatus disclosed is adaptable for use with fabrics or tapes of any desired width instead of single strands or bundles of strands. When handling a fabric, the guide rolls are simply elongated rolls or a number of side-by-side rolls which are of sufficient total width to handle the fabric being treated. The reactant applicators are modified so that the total width of the fabric is treated.

The reactants are held within the strand or the bundle of strands or within the tape, fabric or other textile product by capillary action and the reaction takes place in situ resulting in a silver coating of the multitude of fibers within the fibrous glass product being treated. This process is advantageous in that no plating tank or dipping tank is required. Rather the reactants are applied to and retained in the advancing fibrous glass product being treated. There is no disruption of the fibers due to contact with a molten bath of metal or electroplating baths. Rather the necessary reactants are very gently applied drop by drop and the reaction takes place throughout the interstices of the fibrous glass strand or the like to provide a perfect distribution of the coating metal on each of the fibers within the strand. Obviously if a strand was to be introduced into a tank of silver nitrate solution and then into a tank containing a reducing solution, the reducing solution would soon be contaminated and the process would have to be halted. Using the preferred embodiment shown in the figure, no contamination of the reducing solution takes place and the method is truly a continuous one. At the production rates disclosed, the package 12 of fibrous glass strand is easily replaced by the operator so that the supply of strand to be treated is continuous. A winding apparatus such as that disclosed in Stream et al. United States Patent 2,622,810 may be used to provide continuous winding of the product.

Other reducing agents besides saturated hydrazine sulfate solution may be used. 37 percent formaldehyde may be used as the reducing agent or other reducing agents such as sugar solutions, glyoxal or any of the other well-known reducing agents disclosed in the literature may be used. Hydrazine sulfate solutions or formaldehyde are preferred since they provide fast reaction times which are advantageous in continuous methods.

Subsequent treatments may be desirable to enhance the already improved properties given by the silver coating process of this invention. For instance, lubricants or sizes may be used to improve the handleability of the silver coated products. These materials may be added to the strand, fabric or the like before the product is rolled into a package.

The silver coating achieved by these methods provides a product having novel decorative effects and in addition, provides products which are electroconductive. The products can be used for producing radiation shields, conductors for radio or other electronic circuits, curtains, drapes, upholstery material and other decorative fabrics, fishing lines, awnings, radio and television antenna, ropes, reinforced resins, movie screens, clothing, clutch facings, reinforcing cords or fabric for rubber products and the like.

Other metals may be applied using the methods of this invention. Suitable metal compounds are applied in solution form and then reduced to coat fibrous glass with gold, copper, cadmium, mercury, platinum, antimony, bismuth, arsenic and lead.

Although the invention has been described with respect to specific embodiments, it should be understood that obvious modifications and variations may be made within the spirit and scope of the appended claims.

I claim:
1. A method of coating individual glass filaments in a strand with a substantially continuous coating of metal comprising advancing a strand along an established path, suspending a globule of a solution of silver nitrate from an applicator, passing the strand through the suspended globule of silver nitrate, suspending a globule of hydrazine sulfate solution from a second applicator, directing the advancing strand through the globule of hydrazine sulfate, both the solution of silver nitrate and hydrazine sulfate being distributed throughout the interstices of said strand by capillary action in such quantities as to allow the reaction to go to completion, and allowing the reduction reaction to proceed to completion to effect a substantially continuous deposit of silver upon the surfaces of the filaments of the strand.

2. Method of claim 1 wherein the silver solution comprises 50 parts of silver nitrate crystals and 35 parts of 29% ammonium hydroxide and the hydrazine sulfate solution is a saturated solution of hydrazine sulfate in water.

3. The method of claim 1 wherein the reduction reaction is hastened to completion by heating.

4. The method of claim 1 wherein the advancing strand is heated to from 485° C. to 650° C. prior to application of the solution of silver nitrate to provide heat cleaned glass surfaces.

References Cited in the file of this patent

UNITED STATES PATENTS

| 906,229 | Von Hoessle | Dec. 8, 1908 |
| 2,373,078 | Kleist | Apr. 3, 1945 |
| 2,446,119 | White et al. | July 27, 1948 |
| 2,511,472 | Kmecik | June 13, 1950 |

FOREIGN PATENTS

| 1,593 | Great Britain | 1853 |